United States Patent [19]

McKenna

[11] Patent Number: 5,299,813
[45] Date of Patent: Apr. 5, 1994

[54] FLOATING SEAL RING

[75] Inventor: John M. McKenna, Port Murray, N.J.

[73] Assignee: Ingersoll-Dresser Pump Company, Liberty Corner, N.J.

[21] Appl. No.: 965,557

[22] Filed: Oct. 23, 1992

Related U.S. Application Data

[63] Continuation of Ser. No. 811,134, Dec. 20, 1991, abandoned.

[51] Int. Cl.⁵ .............................................. F16J 15/38
[52] U.S. Cl. ................................. 277/174; 277/27; 277/136
[58] Field of Search .................. 277/174, 175, 27, 53, 277/83, 136, 168, 177; 384/480

[56]       References Cited
         U.S. PATENT DOCUMENTS

| | | | |
|---|---|---|---|
| 967,247 | 8/1910 | Samuelson | 277/53 X |
| 1,722,490 | 7/1929 | Bott et al. | 384/480 |
| 3,001,806 | 9/1961 | Macks . | |
| 4,289,264 | 9/1981 | Rawlins | 277/173 X |
| 4,504,069 | 3/1985 | Stenlund | 277/174 |
| 4,552,368 | 11/1985 | Wallace | 277/174 X |
| 4,889,349 | 12/1989 | Muller | 277/173 X |

FOREIGN PATENT DOCUMENTS

| | | | |
|---|---|---|---|
| 17260 | 2/1983 | Japan | 277/173 |
| 1573282 | 6/1990 | U.S.S.R. | 277/174 |

OTHER PUBLICATIONS

ASME Transactions, vol. 107, pp. 318-325, Jul. 1985.

*Primary Examiner*—William A. Cuchlinski, Jr.
*Assistant Examiner*—Daniel G. DePumpo
*Attorney, Agent, or Firm*—Michael H. Minns

[57]        ABSTRACT

A floating seal ring is disposed within a retainer ring encircling a shaft which extends through the retainer ring. The seal ring is permitted to float radially with respect to the shaft but is retained axially with respect to the shaft. A pin protrudes from the seal ring into a bore in the retainer ring to preclude rotational movement of the seal ring relative to the shaft. The seal ring has an inner diameter which is greater at one end thereof than at the other end thereof so that fluid flow through an annular clearance between the seal ring and the shaft is accelerated. In one embodiment, the seal ring has an annular inner surface that is tapered. In another embodiment, the seal ring has an annular inner surface that is stepped.

4 Claims, 1 Drawing Sheet

FLOATING SEAL RING

This application is a continuation of application Ser. No. 811,134, filed Dec. 20, 1991, now abandoned.

FIELD OF THE INVENTION

This invention relates generally to seal rings and, in particular, to a floating seal ring for controlling fluid leakage through an annular clearance.

BACKGROUND OF THE INVENTION

Floating seal rings are used in pumps to control fluid leakage and generally consist of a seal ring that floats freely within a retainer ring and encircles a rotary or reciprocating shaft. The annular clearance between the seal ring and the shaft is relatively small (i.e., in the range of 0.001 to 0.002 inch). Hydrostatic pressure generated in the pump causes the seal ring to center itself on the shaft. When a pump is operating, high fluid pressure will exist at one end of the floating seal ring while low fluid pressure will exist at the other end of the floating seal ring. If the shaft is deflected or becomes misaligned, the seal ring may be moved against the shaft and cease to float freely, thereby resulting in an undesirable situation commonly referred to as "hydraulic lock".

Stationary seal rings have also been used in pumps to control fluid leakage around shafts. These stationary seal rings are fixed in a housing and, therefore, do not float freely. They have included an annular inner surface which is tapered.

The foregoing illustrates limitations known to exist in present floating seal rings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

An arrangement according to one aspect of the present invention includes a retainer ring, a shaft extending through the retainer ring, and a seal ring disposed in the retainer ring encircling the shaft. The seal ring is permitted to float radially with respect to the shaft while being retained axially with respect to the shaft. The seal ring has an inner diameter which is greater at one end of the seal ring than at the other end of the seal ring. In one embodiment, the seal ring has an annular inner surface which is tapered from one end thereof to the other end thereof. In another embodiment, the seal ring has an annular inner surface which is stepped from one end thereof to the other end thereof. The seal ring accelerates fluid flow through an annular clearance between the seal ring and the shaft from one end of the seal ring to the other end thereof. The arrangement may also include means precluding rotational movement of the seal ring relative to the shaft.

The foregoing and other aspects will become apparent from the following detailed description of the invention when considered in conjunction with the accompanying drawing figures.

DESCRIPTION OF THE PREFERRED EMBODIMENT

Figure 1:
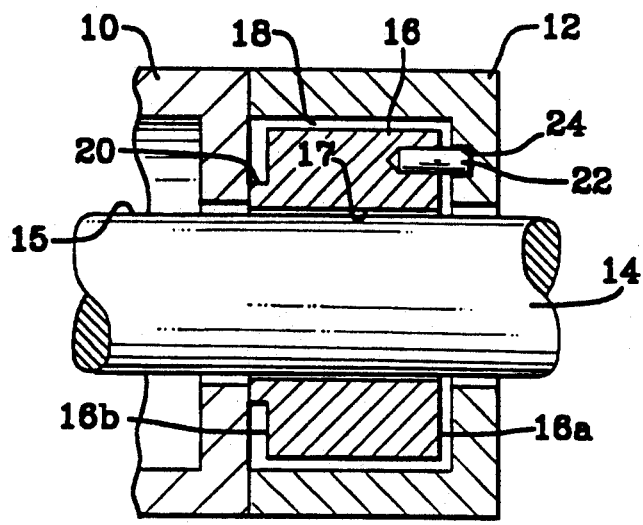
FIG. 1 is a cross-sectional view of an arrangement including a floating seal ring according to the prior art.

Referring to FIG. 1, an arrangement in a hydraulic pump includes a housing 10, a retainer ring 12 attached to the housing 10, a shaft 14 extending through the housing 10 and the retainer ring 12, and a floating seal ring 16 disposed within a cavity 18 in the retainer ring 12 encircling the shaft 14. The seal ring 16 is permitted to float freely with respect to the shaft 14 but it has a lip 20 that engages the housing 10 and thus retains the seal ring 16 axially with respect to the shaft 14. In order to preclude the seal ring 16 from rotational movement relative to the shaft 14, a pin 22 protrudes from the seal ring 16 into a bore 24 in the retainer ring 12. The seal ring 16 has an annular inner surface 17 which is concentric with the outer surface 15 of the shaft 14. The annular clearance between the inner surface 17 of the ring 16 and the outer surface 15 of the shaft 14 is relatively small, i.e., 0.001 to 0.002 inch.

During operation of the arrangement shown in FIG. 1, fluid flows from right to left through the small annular clearance between the seal ring 16 and the shaft 18 resulting in high fluid pressure at one end 16a of the seal ring 16 and low fluid pressure at the other end 16b of the seal ring 16. If the shaft 18 is deflected or becomes misaligned, an undesirable situation commonly referred to as "hydraulic lock" may exist where the seal ring 16 is moved radially so that its inner surface 17 contacts the outer surface 15 of the shaft 14 and thus causes the seal ring 16 to cease floating freely.

Figure 2:
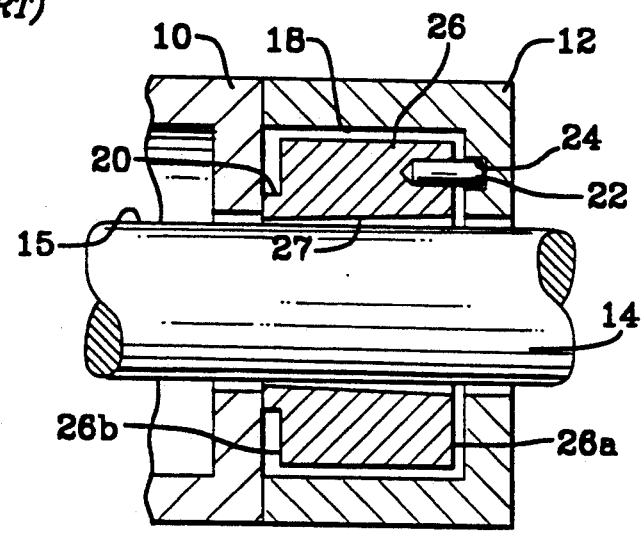
FIG. 2 is a cross-sectional view of an arrangement incorporating a floating seal ring according to one embodiment of the present invention.

In an arrangement shown in FIG. 2, the floating seal ring 16 is replaced by a floating seal ring 26 according to one embodiment of the present invention. The seal ring 26 is identical to the seal ring 16 except for its annular inner surface 27 which is tapered relative to the outer surface 15 of the shaft 14. The inner diameter of the seal ring 26 at the end 26a is slightly greater than the inner diameter of the seal ring 26 at the end 26b.

The seal ring 26 is arranged so that the tapered inner surface 27 causes fluid to accelerate as it flows from right to left in FIG. 2 through the annular clearance between the seal ring 26 and the shaft 14. This accelerating fluid flow permits the seal ring 26 to float even if it contacts the shaft 14. The tapered inner surface 27 of the seal ring 26 allows for deflection or misalignment of the shaft 14 without causing a "hydraulic lock" situation.

Figure 3:
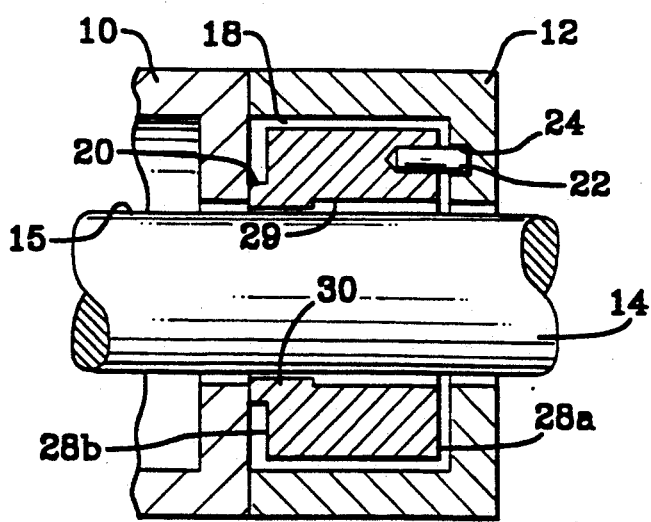
FIG. 3 is a cross-sectional view of an arrangement incorporating a floating seal ring according to another embodiment of the present invention.

In an arrangement shown in FIG. 3, the seal ring 26 is replaced by a floating seal ring 28 according to another embodiment of the present invention. The seal ring 28 has an annular inner surface 29 which is stepped rather than being tapered. The stepped inner surface 29 has the same effect as the tapered inner surface 27 of the seal ring 26. That is, it causes fluid flow to accelerate and it allows deflection or misalignment of the shaft 14.

It can be seen from the foregoing that the present invention provides a floating seal ring which will not become hydraulically locked onto a shaft.

Having described the invention, what is claimed is:

1. In combination:
   a retainer ring;

a rotating shaft extending through the retainer ring;

a seal ring, having a length, disposed in the retainer ring encircling the rotating shaft, the seal ring being permitted to float radially with respect to the rotating shaft while being retained axially with respect to the rotating shaft, the inner diameter of the seal ring being greater than the diameter of the rotating shaft, thereby forming an annular clearance between the shaft and the seal ring along the entire length of the seal ring;

means for preventing hydraulic locking of the seal ring against the rotating shaft, the means for preventing hydraulic locking comprising the annular clearance being greater at one end of the seal ring than at the other end of the seal ring, wherein the seal ring has an annular inner surface which contains a stepped portion, the stepped portion having a smaller inner diameter than the portion of the annular inner surface adjacent the stepped portion; and means for preventing the seal ring from rotating.

2. The apparatus of claim 1 wherein the means for preventing the seal ring from rotating comprises a pin protruding from the seal ring into a bore in the retainer ring.

3. A floating seal ring comprising:

a retainer ring;

a rotating shaft extending through the retainer ring;

a seal ring, having a length, disposed in the retainer ring encircling the rotating shaft, the seal ring being permitted to float radially with respect to the rotating shaft while being retained axially with respect to the rotating shaft, the inner diameter of the seal ring being greater than the diameter of the rotating shaft, thereby forming an annular clearance between the shaft and the seal ring along the entire length of the seal ring;

means for preventing hydraulic locking of the seal ring against the rotating shaft, the means for preventing hydraulic locking comprising the annular clearance being greater at one end of the seal ring than at the other end of the seal ring, wherein the seal ring has an annular inner surface which contains a stepped portion, the stepped portion having a smaller inner diameter than the portion of the annular inner surface adjacent the stepped portion; and means for preventing the seal ring from rotating.

4. The apparatus of claim 3 wherein the means for preventing the seal ring from rotating comprises a pin protruding from the seal ring into a bore in the retainer ring.

* * * * *